United States Patent
Bougie

(10) Patent No.: US 10,524,463 B2
(45) Date of Patent: Jan. 7, 2020

(54) DEVICE FOR GETTING RID OF UNDESIRABLE ANIMALS

(71) Applicant: Normand Bougie, Saint-Come-Liniere (CA)

(72) Inventor: Normand Bougie, Saint-Come-Liniere (CA)

( * ) Notice: Subject to any disclaimer, the term of this patent is extended or adjusted under 35 U.S.C. 154(b) by 230 days.

(21) Appl. No.: 15/886,861

(22) Filed: Feb. 2, 2018

(65) Prior Publication Data

US 2018/0228139 A1  Aug. 16, 2018

(30) Foreign Application Priority Data

Feb. 10, 2017 (GB) .................................. 1702274.0

(51) Int. Cl.
*A01M 23/24* (2006.01)
*A01M 29/00* (2011.01)

(52) U.S. Cl.
CPC ............. *A01M 23/24* (2013.01); *A01M 29/00* (2013.01)

(58) Field of Classification Search
CPC ....... A01M 23/24; A01M 29/00; A01M 99/00
See application file for complete search history.

(56) References Cited

U.S. PATENT DOCUMENTS

| 1,147,606 A | 7/1915 | Chesney |
| 1,936,150 A | 11/1933 | Adams |
| 2,535,868 A | 12/1950 | Roberts |
| 2,837,056 A | 6/1958 | Kanta |
| 3,990,177 A | 11/1976 | Raymond et al. |
| 4,125,256 A * | 11/1978 | Weir ........................ A63B 5/10 124/36 |
| 4,555,863 A * | 12/1985 | Bouffard ............... A01M 23/34 43/87 |
| 5,024,183 A * | 6/1991 | Baer .................... A01K 15/021 119/712 |
| 5,103,769 A | 4/1992 | Mcintosh |
| 5,185,953 A * | 2/1993 | Gross .................... A01M 23/12 43/58 |
| 5,918,409 A * | 7/1999 | Carnwath ............. A01M 19/00 43/61 |
| 8,997,696 B1 * | 4/2015 | Wymer ................. A01M 29/00 119/712 |

FOREIGN PATENT DOCUMENTS

GB      244021 A  * 12/1925 ............ A01M 23/24

* cited by examiner

*Primary Examiner* — Christopher R Harmon

(57) ABSTRACT

A device for getting rid of undesirable animals having a base plate and a catapulting plate, the catapulting plate hingedly attached to the base plate and configured to swing via a hinge member. A biasing member is provided to force the device in an opened position. A trigger plate is configured to engage a hook member, such that the device is loaded into a closed position. The improved device configured to catapult an undesirable animal when the trigger plate is engaged, moving the device from the closed position to the opened position.

9 Claims, 3 Drawing Sheets

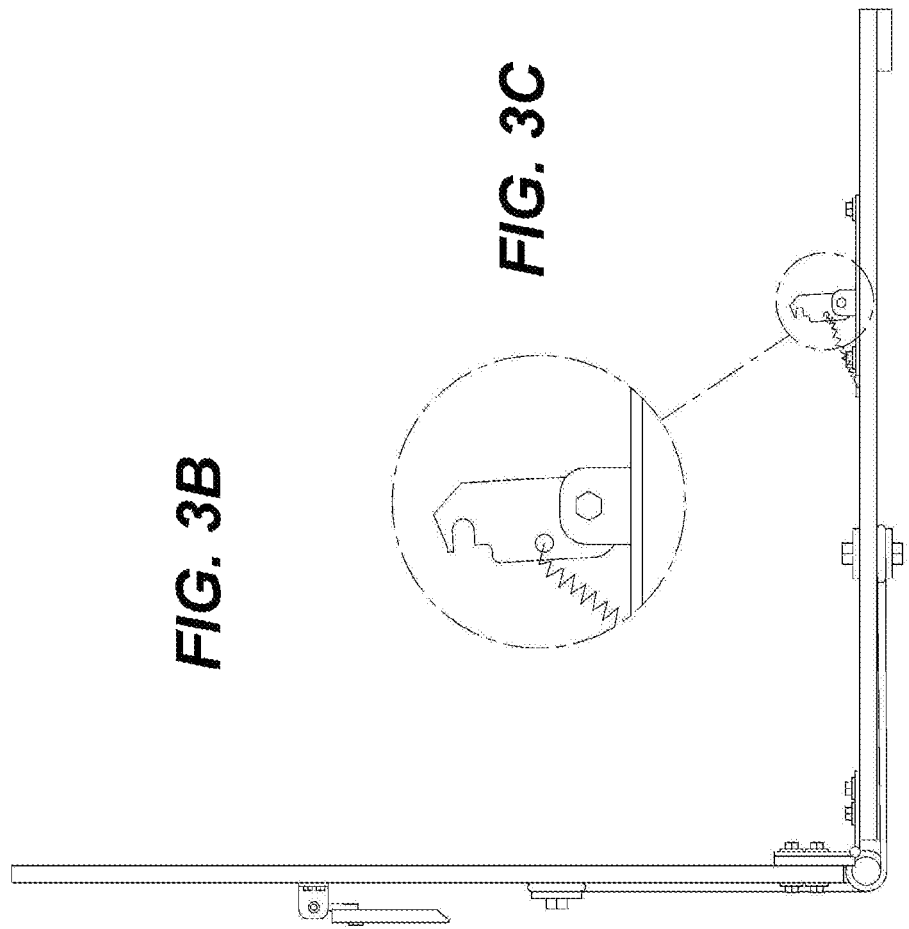
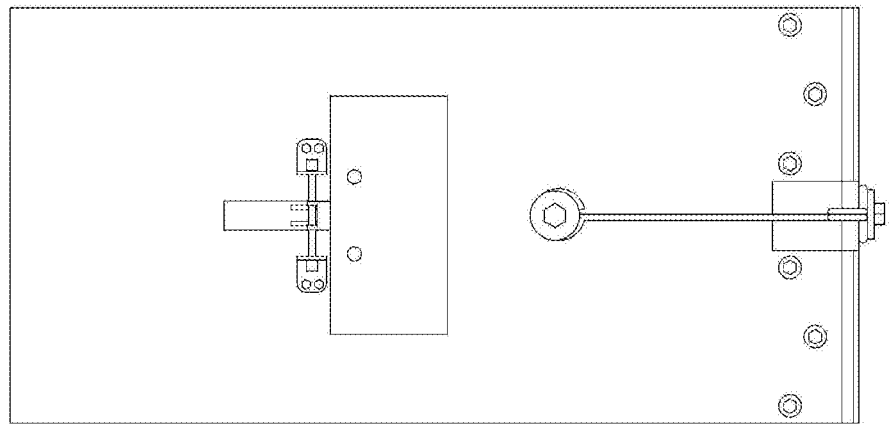

DEVICE FOR GETTING RID OF UNDESIRABLE ANIMALS

CROSS-REFERENCE TO RELATED APPLICATIONS

The present application claims priority to United Kingdom Patent Application serial number GB1702274.0, filed on Feb. 10, 2017 entitled "Device for getting rid of undesirable animals", the disclosure of which is hereby incorporated in its entirety at least by reference.

BACKGROUND OF THE INVENTION

1. Field of the Invention

The present invention generally relates to animal prevention devices, but more particularly to a device for getting rid of undesirable animals.

2. Description of Related Art

It is well known that on some properties various small mammals, both wild and domesticated, can create minor damages or just be a nuisance. Although many traps have been created to capture wild animals such as raccoon, foxes, etc., the traps designed not to harm the animal may not be appropriate when it comes to scaring a domesticated pet, such as the neighbor's cat or dog.

Some prior art that has attempted to address this problem. For example, U.S. Pat. No. 2,837,056 to Kanta discloses a device providing a way for breaking animals, such as dogs and other pets of the habit of eating any food except that given to them by their owners at a customary place. The device is adapted to be concealed by a scrap of food, and having compression or tension operated means for striking the animal a sharp blow on the mouth or jaw when he attempts to remove the food scrap. Other patents such as U.S. Pat. No. 1,936,150 to Adams, for example, uses a similar mechanism, but intended as a toy configured to make an "explosive" sound.

U.S. Pat. No. 5,103,769 to Macintosh does describe an invention directed at deterring animals from engaging in prohibited behavior. A flap pivots about retainers mounted on a base. An elastic member extends from under the base to a protruding tab on the flap. Disturbance of the base, such as by the undesired activity of a pet, causes movement of the flap relative to the base and contraction of the elastic. The flap accelerates about the retainers and impacts against the base. This generates a sharp startling sound and movement of the device which acts to discontinue the activity and deter the animal from the repeated occurrence of such behavior.

However, the prior art fails to show a device that is configured to propel an animal airborne so as to actually scare the animal, which goes beyond simple loud noises of nose nipping as taught in the prior art. Consequently, there is therefore need for improvement in the prior art.

BRIEF SUMMARY OF THE INVENTION

In one embodiment of the present invention, a device for getting rid of undesirable animals is provide, comprising a base plate having a first top surface and a first bottom surface; a catapulting plate having a second top surface and a second bottom surface, wherein the catapulting plate is hingedly attached to the base plate via a first hinge member; a biasing member attached to the base plate and the catapulting plate, the biasing member configured to force the device in an opened position, wherein the opened position is defined as the catapulting plate positioned and extended away from the base plate at a maximum angle allowed by the first hinge member; a trigger plate attached to a stub member hingedly attached to the top surface of the catapulting plate via a second hinge member; a hook member positioned on the first top surface; an opening provided on the catapulting plate, the opening enabling the hook member to pass through the catapulting plate, such that the hook member is configured to engage the second hinge member when the device is in a closed position; and, wherein the device is configured to move from the closed position to the opened position when the trigger plate is pushed downwardly.

In one embodiment, the base plate and the catapulting plate are the same size and shape. In one embodiment, the base plate and the catapulting plate are rectangular. In another embodiment, the hook member comprises a first notch and a second notch, and the first notch is configured to engage the second hinge member when the device is in the closed position. In one embodiment, the stub member is configured to push against the second notch disengaging the second hinge member from the first notch when the trigger plate is pushed downwardly, freeing the catapulting plate from the hook member and moving the device from the closed position to the opened positioned. In another embodiment, the hook member is attached to a hook spring, wherein the hook spring is configured to pull the hook member towards the first top surface of the base plate providing the force necessary for the hook member to stay engaged with the second hinge member. In yet another embodiment, the trigger plate is configured to accept bait to attract an undesirable animal. In one embodiment, the trigger plate is centrally positioned on the second top surface, such that the undesirable animal is required to be fully on top of the catapulting plate to access the bait. In one embodiment, the undesirable animal is configured to be catapulted in the air when the device moves from the closed position to the opened positioned.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 3A is a rear view a device for getting rid of undesirable animals according to an embodiment of the present invention;

FIG. 3B is a side view a device for getting rid of undesirable animals according to an embodiment of the present invention; and, FIG. 3C is a detailed view of FIG. 3B.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a device for getting rid of undesirable animals. The word "a" is defined to mean "at least one."

Referring to any of the accompanying figures, a device 10 for getting rid of undesirable animals is illustrated. The device comprises a base plate 12 and a catapulting plate 14. In one embodiment, the base plate may be a variety of shapes, however preferably the base plate is constructed from a rectangular shape. In one embodiment, the striking plate may be a variety of shapes, however preferably the catapulting plate is constructed from a rectangular shape. In one embodiment, the catapulting plate is preferably the same shape and size as the base plate. The base plate and catapulting plate both include a top and bottom surface.

Figure 1:
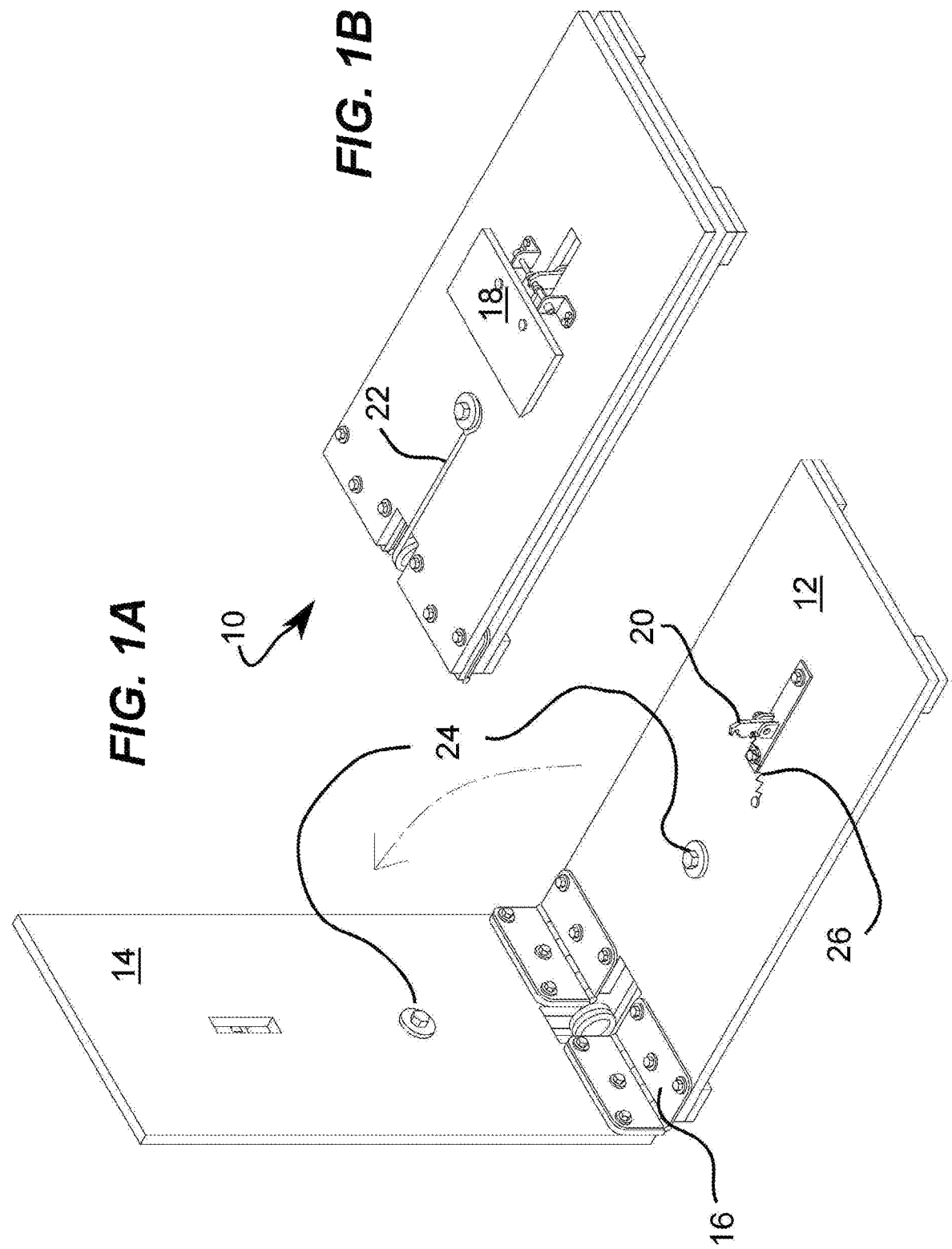
FIG. 1A is an isometric view of a device for getting rid of undesirable animals in an open position according to an embodiment of the present invention.
FIG. 1B is an isometric view of a device for getting rid of undesirable animals in a closed position according to an embodiment of the present invention.
Figure 2:
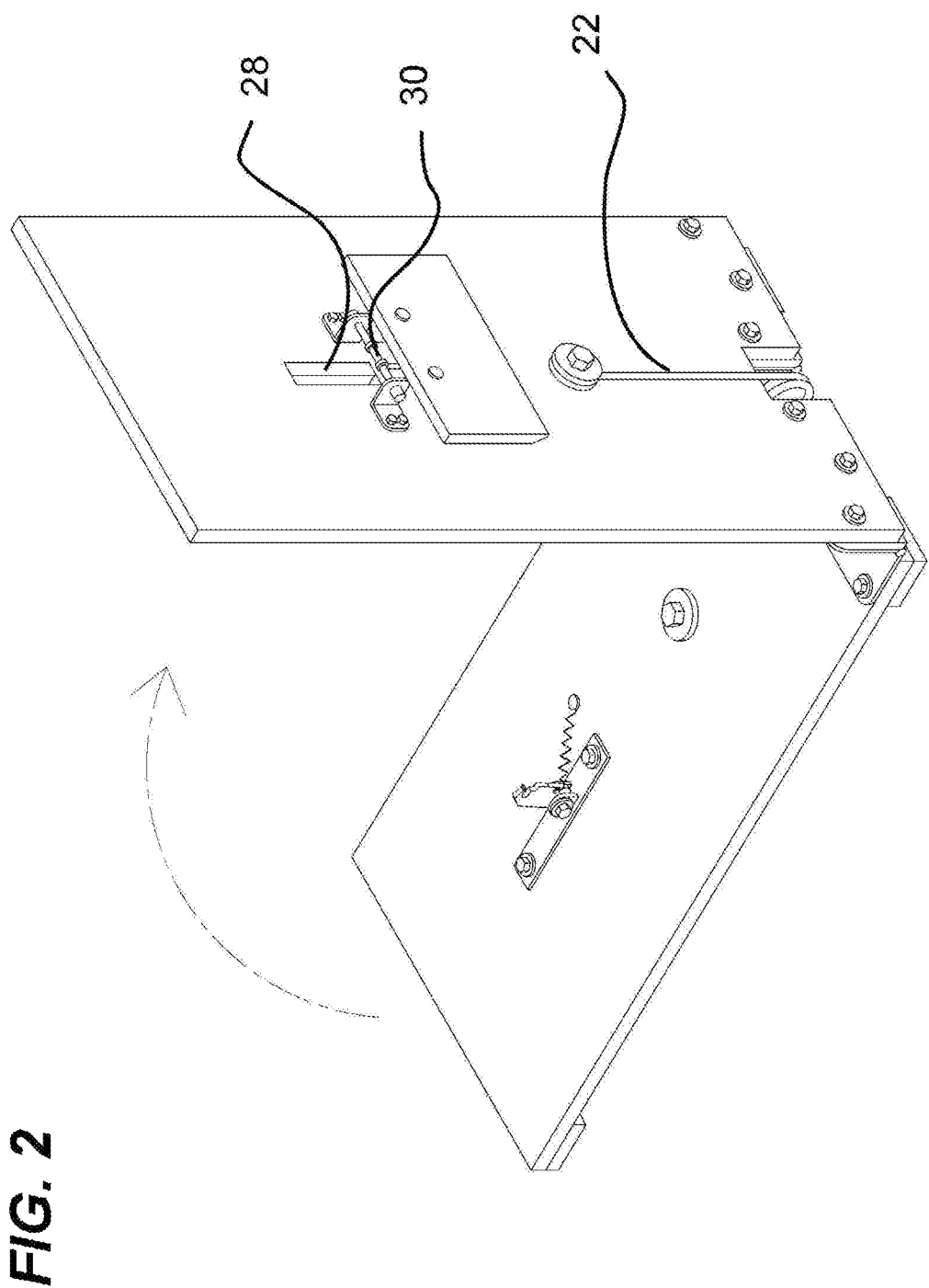
FIG. 2 is an alternative angle of FIG. 1A.

In one embodiment, the catapulting plate is hingedly attached to the base plate a first hinge member 16. In one embodiment, a biasing member 22 is provided. The biasing member is positioned on the top surface of the catapulting plate and the bottom surface of the base plate, wherein the biasing member is configured to force the device in an open position as seen in FIG. 1A. The open position is defined as the catapulting plate positioned and extended away from the base plate at a maximum angle allowed by the first hinge member. In one embodiment, the maximum angle is 90 degrees, however it is understood that the maximum angle may vary. In one embodiment, the basing member is securely attached to each plate via mechanical fasteners 24, such as nuts and bolts.

In one embodiment, a trigger plate 18 is hingedly attached to the top surface of the catapulting plate via a second hinge member 19 by way of stub member 30. In one embodiment, the base plate comprises a hook member 20 on the top surface of the base plate. The hook member comprises a first notch 21 and a second notch 23, best seen in FIG. 3C. An opening 28 is positioned on the catapulting plate such that when the catapulting plate is in a closed position, the hook extends through the opening as seen in FIG. 1B. During operation, a user exerts the necessary force to push the catapulting plate towards the top surface of the base plate, allowing the hook to extend through the opening. Next, the hook member, and more specifically the first notch of the hook member connects and engages with the second hinge member. In one embodiment, the hook member is attached to a hook spring 26, pulling the hook member towards the top surface of the base plate providing the force necessary for the hook to stay engaged with the second hinge member. Once engaged, the device is in a closed or "loaded" position as shown in FIG. 1B. The device is now ready to be used.

During use, bait may be placed on trigger plate. It is a particular advantage of the present invention to position the trigger plate well within the catapulting plate, such that an animal is required to be fully on top of the catapulting plate to access the bait placed on the trigger plate. In one embodiment, well within is defined as centrally positioned. When the trigger plate is pushed downward, via the animal eating the bait, the trigger plate rotates around the second hinge member, which pushes stub member 30 against the second notch 23 of the hook member, disengaging the second hinge member from the first notch 21 freeing the catapulting plate from the hook member. Next, the stored potential energy via the biasing member is transferred into kinetic energy swinging or catapulting the plate into an open position, providing enough force to propel the animal into the air.

It is a particular advantage to provide the device in a verity of sizes so as to be best adapted to various animal sizes ranging from field mice to raccoons. Typically, animals are guided to the device by creating some sort of fencing made out of any of a variety of obstacles around it, such that hat there is only one way to get to the device. The device itself is preferably covered with leaves and other naturally occurring material so as to act as camouflage. The animal can still smell the bait and find its way to it. The location of the bait on the trigger plate, and the positioning of the trigger plate on the catapulting plate, as well as the adapted size of the catapulting plate according to animal size, ensures that the animal will be adequately propelled when fully standing on top of catapulting plate. In one embodiment, the bottom surface of the base plate may comprise feet providing stability and friction.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A device for getting rid of undesirable animals comprising:
 a base plate having a first top surface and a first bottom surface;
 a catapulting plate having a second top surface and a second bottom surface, wherein the catapulting plate is hingedly attached to the base plate via a first hinge member;
 a biasing member attached to the base plate and the catapulting plate, the biasing member configured to force the device in an opened position, wherein the opened position is defined as the catapulting plate positioned and extended away from the base plate at a maximum angle allowed by the first hinge member;

a trigger plate attached to a stub member hingedly attached to the top surface of the catapulting plate via a second hinge member;

a hook member positioned on the first top surface;

an opening provided on the catapulting plate, the opening enabling the hook member to pass through the catapulting plate, such that the hook member is configured to engage the second hinge member when the device is in a closed position; and, wherein the device is configured to move from the closed position to the opened position when the trigger plate is pushed downwardly.

2. The device for getting rid of undesirable animals of claim 1, wherein the base plate and the catapulting plate are the same size and shape.

3. The device for getting rid of undesirable animals of claim 2, wherein the base plate and the catapulting plate are rectangular.

4. The device for getting rid of undesirable animals of claim 1, wherein the hook member comprises a first notch and a second notch, and the first notch is configured to engage the second hinge member when the device is in the closed position.

5. The device for getting rid of undesirable animals of claim 4, wherein the stub member is configured to push against the second notch disengaging the second hinge member from the first notch when the trigger plate is pushed downwardly, freeing the catapulting plate from the hook member and moving the device from the closed position to the opened positioned.

6. The device for getting rid of undesirable animals of claim 4, wherein the hook member is attached to a hook spring, wherein the hook spring is configured to pull the hook member towards the first top surface of the base plate providing the force necessary for the hook member to stay engaged with the second hinge member.

7. The device for getting rid of undesirable animals of claim 1, wherein the trigger plate is configured to accept bait to attract an undesirable animal.

8. The device for getting rid of undesirable animals of claim 7, wherein the trigger plate is centrally positioned on the second top surface, such that the undesirable animal is required to be fully on top of the catapulting plate to access the bait.

9. The device for getting rid of undesirable animals of claim 8, wherein the undesirable animal is configured to be catapulted in the air when the device moves from the closed position to the opened positioned.

* * * * *